US010178002B2

United States Patent
Rachlin

(10) Patent No.: US 10,178,002 B2
(45) Date of Patent: Jan. 8, 2019

(54) SYSTEM AND METHOD FOR CAPTURING AND DISPLAYING PACKETS AND OTHER MESSAGES IN LOCAL CONTROL NETWORK (LCN)

(71) Applicant: Honeywell International Inc., Morris Plains, NJ (US)

(72) Inventor: Elliott Rachlin, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 177 days.

(21) Appl. No.: 15/009,544

(22) Filed: Jan. 28, 2016

(65) Prior Publication Data

US 2017/0222895 A1 Aug. 3, 2017

(51) Int. Cl.
*H04L 29/08* (2006.01)
*H04L 12/26* (2006.01)
*H04L 12/24* (2006.01)

(52) U.S. Cl.
CPC .......... *H04L 43/08* (2013.01); *H04L 41/0631* (2013.01); *H04L 43/062* (2013.01); *H04L 43/0847* (2013.01); *H04L 43/12* (2013.01); *H04L 67/1097* (2013.01); *H04L 67/2842* (2013.01); *H04L 67/36* (2013.01)

(58) Field of Classification Search
None
See application file for complete search history.

(56) References Cited

U.S. PATENT DOCUMENTS

| | | | |
|---|---|---|---|
| 2008/0101225 A1* | 5/2008 | Tassinari | H04L 12/66 370/230 |
| 2009/0052332 A1* | 2/2009 | Fukuyama | H04L 41/06 370/242 |
| 2009/0279429 A1 | 11/2009 | Griffoul | |
| 2009/0310485 A1* | 12/2009 | Averi | H04L 45/00 370/232 |
| 2010/0211675 A1* | 8/2010 | Ainali | H04L 43/0852 709/224 |
| 2012/0124240 A1 | 5/2012 | De et al. | |
| 2012/0198048 A1* | 8/2012 | Ioffe | H04L 43/028 709/224 |
| 2012/0278433 A1 | 11/2012 | Liu et al. | |
| 2014/0115705 A1* | 4/2014 | Fujishima | H04L 43/028 726/23 |

OTHER PUBLICATIONS

Foreign Communication from Related Counterpart Application, PCT/US2017/013146, International Search Report dated May 2, 2017, 5 pages.
Foreign Communication from Related Counterpart Application, PCT/US2017/013146, Written Opinion of the International Searching Authority dated May 2, 2017, 5 pages.
"Packet analyzer", Wikipedia, Jan. 14, 2016, 4 pages.

* cited by examiner

Primary Examiner — Natisha D Cox

(57) ABSTRACT

A method includes detecting, by a Local Control Network (LCN) Monitor, a transmission of a data packet from a first device to at least one second device over the LCN. The LCN Monitor is not a source or destination of the data packet. The method also includes obtaining, by the LCN Monitor, a copy of the transmitted data packet. The method further includes decoding, by the LCN Monitor, the obtained data packet. In addition, the method includes storing, by the LCN Monitor, the decoded data packet in a storage device.

18 Claims, 2 Drawing Sheets

SYSTEM AND METHOD FOR CAPTURING AND DISPLAYING PACKETS AND OTHER MESSAGES IN LOCAL CONTROL NETWORK (LCN)

TECHNICAL FIELD

This disclosure generally relates to industrial process control and automation systems. More specifically, this disclosure relates to a system and method for capturing and displaying packets and other messages in a Local Control Network (LCN).

BACKGROUND

Devices in an industrial process control and automation system often continuously communicate with one another to perform various functions related to process control and optimization. These devices typically communicate with one another without tracking or recording their communications. Some industrial process control and automation systems include one or more process historians that can record specific types of data, but many transmissions between devices in the industrial process control and automation systems are used and then discarded without long-term storage.

SUMMARY

This disclosure provides a system and method for capturing and displaying packets and other messages in a Local Control Network (LCN).

In a first embodiment, a method includes detecting, by an LCN Monitor, a transmission of a data packet from a first device to at least one second device over an LCN. The LCN Monitor is not a source or destination of the data packet. The method also includes obtaining, by the LCN Monitor, a copy of the transmitted data packet. The method further includes decoding, by the LCN Monitor, the obtained data packet. In addition, the method includes storing, by the LCN Monitor, the decoded data packet in a storage device.

In a second embodiment, an apparatus includes at least one interface configured to communicate over an LCN and at least one processing device. The at least one processing device is configured to detect via the at least one interface a transmission of a data packet from a first device to at least one second device over the LCN, where the apparatus is not a source or destination of the data packet. The at least one processing device is also configured to obtain a copy of the transmitted data packet and to decode the obtained data packet. In addition, the at least one processing device is configured to store the decoded data packet in a storage device.

In a third embodiment, a non-transitory computer readable medium contains instructions that, when executed by at least one processing device of an LCN Monitor, cause the at least one processing device to detect a transmission of a data packet from a first device to at least one second device over an LCN. The LCN Monitor is not a source or destination of the data packet. The medium also contains instructions that, when executed by the at least one processing device, cause the at least one processing device to obtain a copy of the transmitted data packet, decode the obtained data packet, and store the decoded data packet in a storage device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
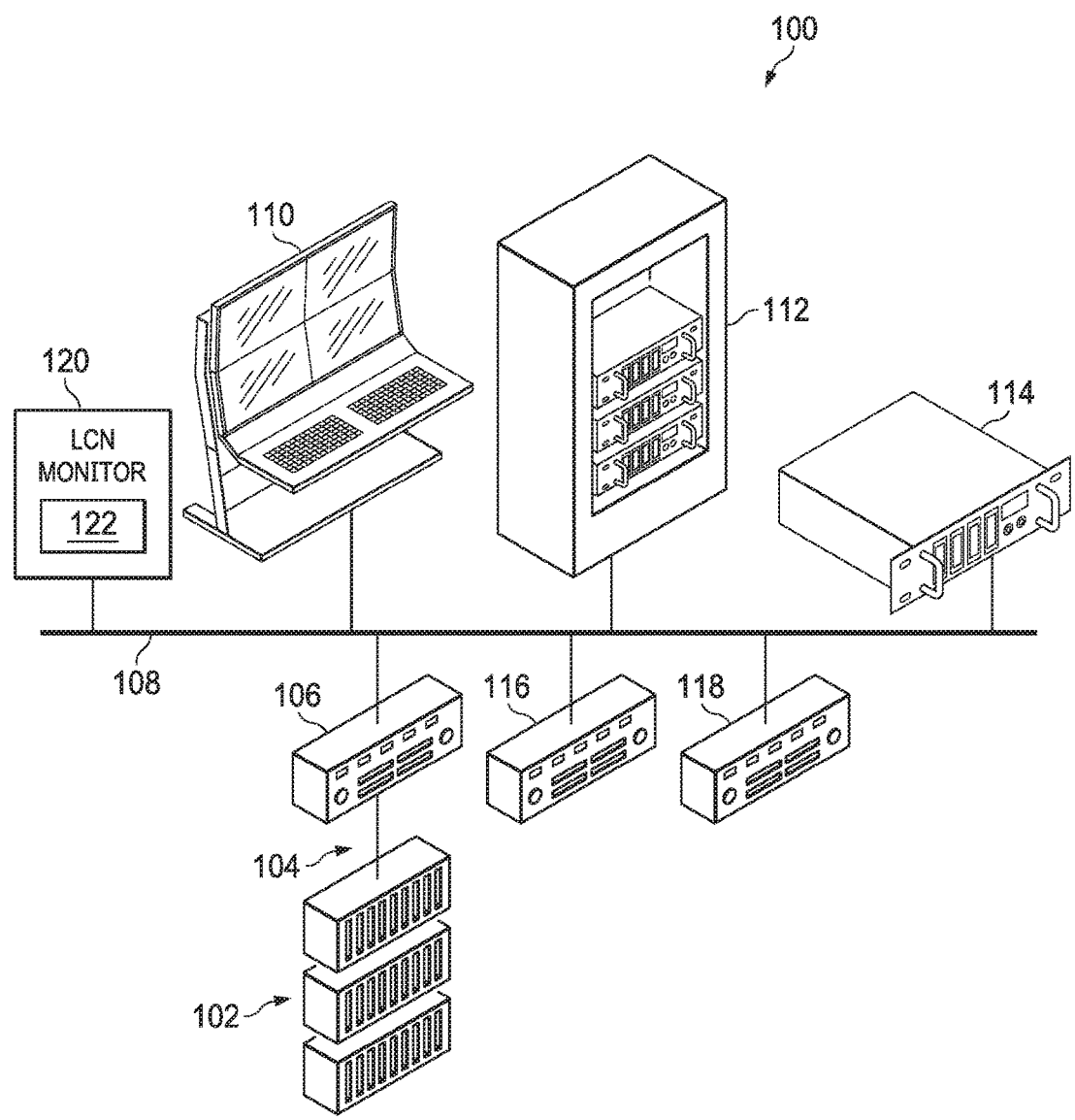
FIG. 1 illustrates an example industrial process control and automation system according to this disclosure.
Figure 2:
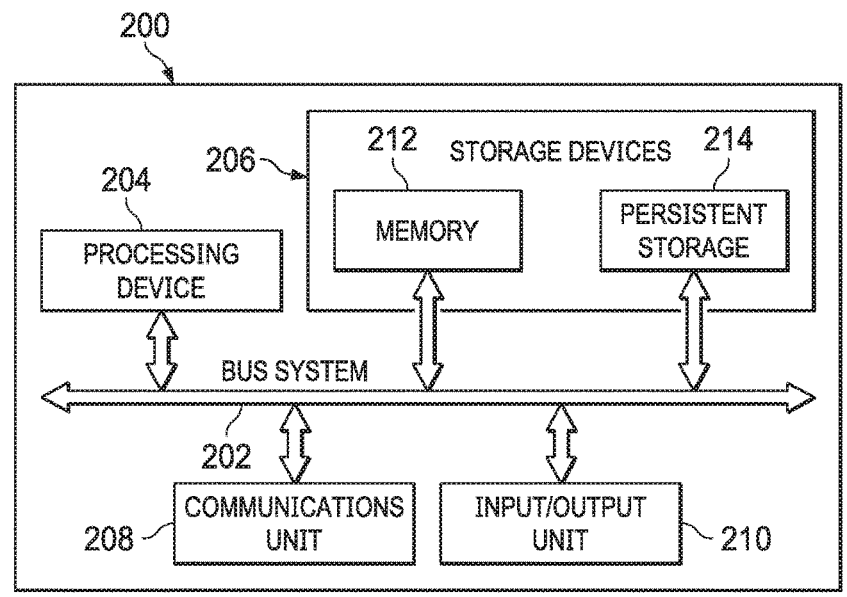
FIG. 2 illustrates an example device for capturing and displaying packets and other messages in a Local Control Network (LCN) according to this disclosure.
Figure 3:
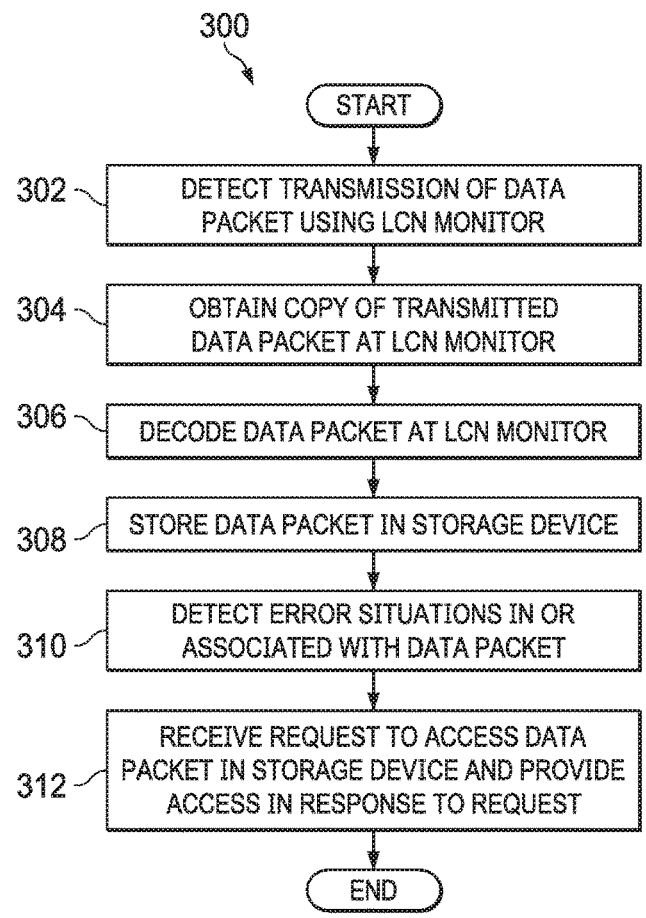
FIG. 3 illustrates an example method for capturing and displaying packets and other messages in an LCN according to this disclosure.

FIGS. 1 through 3, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

FIG. 1 illustrates an example industrial process control and automation system 100 according to this disclosure. As shown in FIG. 1, the system 100 includes one or more controllers 102, which are often said to reside within or form a part of a "Level 1" controller network in a control and automation system. Each controller 102 is capable of controlling one or more characteristics in an industrial process system. A process system generally represents any system or portion thereof configured to process one or more products or other materials in some manner. For instance, the controllers 102 could receive measurements from one or more sensors and use the measurements to control one or more actuators.

The controllers 102 communicate via a network 104 with at least one gateway 106. The network 104 represents one or more communication paths that support interactions with the controllers 102 using an industrial communication protocol. The network 104 represents any suitable industrial process control network.

In this example, the controllers 102 communicate with higher-level devices and systems via the gateway(s) 106. Here, each gateway 106 facilitates communication between the network 104 and a supervisory network 108, such as a Local Control Network (LCN). Each gateway 106 includes any suitable structure facilitating communication with one or more devices via a supervisory network. The supervisory network 108 represents a network facilitating communication among higher-level process control and automation devices and systems. Note, however, that the use of the gateway(s) 106 is optional and that the controllers 102 could communicate with higher-level devices and systems directly over the supervisory network 108.

Various other components in the system 100 support a wide range of process control and automation-related functions. For example, one or more operator consoles 110 can be used by operators to interact with the system 100. At least one supervisory controller 112 and at least one server 114 provide higher-level control in the system 100. For instance, the supervisory controller 112 and/or server 114 could perform more advanced planning or scheduling operations, execute higher-level control strategies, or perform other functions. At least one application processing platform 116 can be used to automate various procedures in the system 100. At least one historian 118 can be used to collect and store data associated with operation of the system 100 over time. Various ones of these components are often said to reside within or form a part of a "Level 2" supervisory network in a control and automation system.

Each operator console 110 includes any suitable structure for facilitating operator interactions, such as an EXPERION STATION TPS (EST) from HONEYWELL INTERNATIONAL INC. Each supervisory controller 112 includes any suitable structure for providing supervisory control, such as an APPLICATION CONTROL ENVIRONMENT-TPS (ACE-T) node from HONEYWELL INTERNATIONAL INC. Each server 114 represents any suitable computing device, such as an EXPERION SERVER TPS from HONEYWELL INTERNATIONAL INC. (or a redundant pair of such servers). Each application processing platform 116 includes any suitable structure for executing automated procedures, such as an APPLICATION MODULE (AM) from HONEYWELL INTERNATIONAL INC. Each historian 118 includes any suitable structure for storing data, such as a HISTORY MODULE (HM) from HONEYWELL INTERNATIONAL INC.

As noted above, devices in an industrial process control and automation system routinely communicate with one another without tracking or recording their communications. While the process historian 118 can be used to store certain information that is directed to the process historian 118 for storage, many transmissions between devices in the industrial process control and automation system are used and then discarded without long-term storage.

This lack of tracking or storage of communications sent over an LCN can create various problems. For example, the lack of information about LCN communications may make it difficult or impossible to detect or diagnose problems in the system 100. It may be desirable to collect information about LCN communications in order to conduct certain analyses of the LCN. These analyses could include understanding network traffic, identifying methods for reducing or eliminating traffic congestion, and identifying areas where breaking up a large LCN into smaller LCNs might be beneficial (such as from a traffic loading perspective). It may also be desirable to detect the operation of new LCN nodes (such as enhanced LCN or ELCN nodes) in order to verify that the new nodes are configured or operating correctly.

In accordance with this disclosure, at least one LCN Monitor 120 is provided in the system 100 and implements a mechanism for collecting all or substantially all of the packets or other messages that are transmitted on the LCN 108, regardless of the messages' addressed destinations. Messages can be recorded and individually decoded into human-readable form (such as into English, French, German, or other language) and stored on at least one mass storage device 122 for convenient access. Both binary and "content-decoded" forms of the captured messages could be stored or provided to users. In addition to packet capture, the LCN Monitor 120 also assembles multiple packets into multi-packet messages. These in turn can be decoded into human-readable form and recorded on the mass storage device 122.

Once stored in the mass storage device 122, the captured information can be used in any suitable manner. For example, a user can access the information via an operator console 110 or other computing device to query the stored information and view the results. A user can also trigger execution of one or more analysis routines at the operator console 110 or other computing device to analyze the captured information and view the analysis results. The captured information could be used in any other or additional manner.

The LCN Monitor 120 can be run for long intervals of time, capturing large and statistically robust collections of packet and message data. This captured data can be the source material for one or multiple analyses that help to improve network and overall system behavior. The captured material can also be helpful in analyzing the correct operation of new nodes added to the network, including both classical LCN nodes and newer ELCN nodes. This captured material can further be helpful in detecting cyberattacks that are made via packets or other messages secretly transmitted on the LCN 108 by bad actors.

The LCN Monitor 120 includes any suitable structure for capturing and storing packets and other messages sent over an LCN. The LCN Monitor 120 could, for example, denote a computing device executing software for capturing, decoding, and analyzing network traffic sent over an LCN. As a particular example, the LCN Monitor 120 could be implemented using a computer with an LCN input/output (I/O) interface card, which is operated by custom software created for the purpose of capturing and recording LCN message traffic. The interface card can operate in "promiscuous mode" in which all or substantially all transmitted packets are captured and provided to the software, regardless of where on the network each transmitted packet is addressed. The mass storage device 122 includes any suitable structure for storing and facilitating retrieval of large amounts of information. While shown as forming part of the LCN Monitor 120, at least one mass storage device 122 could be located outside of the LCN Monitor 120 and be communicatively coupled to the LCN Monitor 120.

In particular embodiments, as individual packets are received, the packets can be classified as being single-packet messages or packets that are part of a sequence of packets forming an entire message. In the case of single-packet messages, the packets can be immediately decoded and recorded onto mass storage. In the case of multiple packets that form a multi-packet message, the packets can be saved and assembled into a full message prior to decoding and recording on mass storage. During the process of assembling a multi-packet message out of individual component packets, a number of error situations may be detected, such as packet sequence number errors, orphan packets, and timed-out message reconstructions.

Although FIG. 1 illustrates one example of an industrial process control and automation system 100, various changes may be made to FIG. 1. For example, the system 100 could include any number of controllers, networks, gateways, operator consoles, servers, platforms, historians, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment in which packets and other messages in an LCN can be captured. This functionality can be used in any other suitable system.

FIG. 2 illustrates an example device 200 for capturing and displaying packets and other messages in an LCN according to this disclosure. The device 200 could, for example, represent the LCN Monitor 120 of FIG. 1. Note, however, that the LCN Monitor 120 could be implemented in any other suitable manner and that the device 200 could be used in any other suitable system.

As shown in FIG. 2, the device 200 includes a bus system 202, which supports communication between at least one processing device 204, at least one storage device 206, at least one communications unit 208, and at least one input/output (I/O) unit 210. The processing device 204 executes instructions that may be loaded into a memory 212. The processing device 204 may include any suitable number(s) and type(s) of processors or other devices in any suitable arrangement. Example types of processing devices 204 include microprocessors, microcontrollers, digital signal processors, field programmable gate arrays, application specific integrated circuits, and discrete circuitry.

The memory 212 and a persistent storage 214 are examples of storage devices 206, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a read only memory, hard drive, Flash memory, or optical disc. The storage device 206 can be configured to store collected data packets and other messages transmitted on an LCN as discussed above.

The communications unit 208 supports communications with other systems or devices. For example, the communications unit 208 could include a network interface card or a wireless transceiver facilitating communications over a network, such as an LCN. As a particular example, the communications unit 208 could denote an LCN I/O interface card or other circuitry configured for capturing and recording LCN traffic data. The communications unit 208 may support communications through any suitable physical or wireless communication link(s).

The I/O unit 210 allows for input and output of data. For example, the I/O unit 210 may provide a connection for user input through a keyboard, mouse, keypad, touchscreen, or other suitable input device. The I/O unit 210 may also send output to a display, printer, or other suitable output device.

In some embodiments, the processing device 204 is configured to control the detection of transmitted data packets and other messages on one or more LCNs and is configured to control the collection of copies of the messages, regardless of the messages' destinations. The processing device 204 is also configured to assemble multiple data packets into multi-packet messages. Captured messages can be decoded, such as into human-readable form, and stored by the processing device 204. The processing device 204 can activate a communications unit 208 into a "promiscuous state" to capture the transmitted data packets. As individual data packets are received, the processing device 204 classifies the data packets based on whether a data packet contains a complete message or whether a data packet is a fragment of a complete message (such a data packet in a sequence of data packets). If the data packet contains a complete message, the processing device 204 decodes the data packet and records or stores the decoded data packet in the storage 122. If the data packet is a fragment of a complete message, the processing device 204 saves the data packet, combines multiple data packets to form a completed message, and decodes and stores the completed message. In some embodiments, while the processing device 204 assembles multi-packet messages, the processing device 204 can detect if one or more error situations are present in at least one of the data packets.

Although FIG. 2 illustrates one example of a device 200 for capturing and displaying packets and other messages in an LCN, various changes may be made to FIG. 2. For example, various components in FIG. 2 could be combined, further subdivided, or omitted and additional components could be added according to particular needs. Also, LCN Monitors can come in a wide variety of configurations, and FIG. 2 does not limit this disclosure to any particular configuration of an LCN Monitor.

FIG. 3 illustrates an example method 300 for capturing and displaying packets and other messages in an LCN according to this disclosure. For ease of explanation, the method 300 is described as being performed by the LCN Monitor 120 in FIG. 1 implemented as shown in FIG. 2. However, the method 300 could be performed using any suitable device and in any suitable system.

Transmission of a data packet on an LCN is detected using an LCN Monitor at step 302. This could include, for example, the LCN Monitor 120 detecting transmission of a data packet on the LCN 108 from a first networked device to at least one other networked device. The LCN Monitor 120 need not be the source or destination of the data packet. In some embodiments, the LCN Monitor 120 can detect every transmission of a data packet over the LCN. In particular embodiments, the LCN Monitor 120 can detect every transmission of a data packet over the LCN for a specified period of time. In other particular embodiments, the LCN Monitor 120 can detect every transmission of a data packet over the LCN involving a specified networked device or type of networked device (possibly for a specified period of time), and messages involving other networked devices or types of networked devices could be discarded. The specified periods of time, networked devices, or types of networked devices could be defined in any suitable manner, such as by a user via the operator console 110.

A copy of the transmitted data packet is obtained by the LCN Monitor at step 304. This could include, for example, the processing device 204 of the LCN Monitor 120 capturing the transmitted data packet and generating a copy of the transmitted data packet. If necessary, the LCN Monitor 120 could forward the data packet on to a destination identified by the transmitted data packet. In some embodiments, the LCN Monitor 120 can also or alternatively send a request to one or more nodes on the LCN to transmit a copy of received data packets to the LCN Monitor 102. Subsequently, the LCN Monitor 120 can receive a copy of a transmitted data packet from one or more of the nodes.

The captured data packet is decoded at step 306. This could include, for example, the processing device 204 of the LCN Monitor 120 decoding the obtained data packet into a human-readable form and/or a binary form. This step could include the processing device 204 classifying the captured data packet as a single-packet message or as part of a multi-packet message. As noted above, a single-packet message could be decoded immediately, while the LCN Monitor 120 could wait until all packets are received and reassembled prior to decoding a multi-packet message. The decoded data packet is stored at step 308. This could include, for example, the processing device 204 of the LCN Monitor 120 providing the decoded message to the storage device 122 for long-term storage.

At this point, any suitable functions could be performed using information about the captured data packet or a collection of captured data packets. For example, one or more errors in or associated with the captured data packet(s)

could be identified at step 310. This could include, for example, the LCN Monitor 120 detecting any packet sequence number errors, orphan packets, or timed-out message reconstructions. As another example, the LCN Monitor or other device could receive a request to access one or more data packets in the storage device, and the LCN Monitor or other device could provide access to the requested data at step 312. This could include, for example, the LCN Monitor 120 receiving a query (such as one based on time, device, or device type), retrieving suitable data from the storage device 122, and displaying the retrieved data on an operator console 110 or other destination.

Although FIG. 3 illustrates one example of a method 300 for capturing and displaying packets and other messages in an LCN, various changes may be made to FIG. 3. For example, while shown as a series of steps, various steps shown in FIG. 3 could overlap, occur in parallel, occur in a different order, or occur multiple times. Moreover, some steps could be combined or removed and additional steps could be added according to particular needs.

Note that captured and decoded packets could be displayed in any suitable format. The following example illustrates one possible format in which various information about captured packets and their contents can be displayed. In this example format, a message length, channel, times, type, sequence number, contents, and other information are provided.

```
500. Message_Length: 62 Channel: 1 Time1: 530255311544 Time2: 530255311544
PACKET_DECODE: PHYSICAL_CHANNEL_1 BROADCAST Destin: $5000 Source: $0060(Node 96)
PkType: 2(DATA_PACKET) Del_Class: 0(DC_I_Am_Alive) Total_Size: 62 Packet_Size: 62
Msg_ID: $0000 Pkt_Seq_No: 0 Last_Pkt_Seq_No: 0 Version: 0
  5000  0060  0200  003E  003E  0000  0000  0000  4A5B  0102  0000  4D05  010D  4808  0039  0000
  0000  FFFF  0000  0000  FFFF  0000  0000  FFFF  0000  0000  FFFF  0000  0000  FFFF  0000  0000
  FFFF  0000  0000  FFFF  0000  0000  FFFF  0000  0000  FFFF  0000  0000  FFFF  0000  0000  FFFF
  0000  0000  FFFF  0000  0000  FFFF  0000  0000  00D5  00D5  0D0D  0D0D  0101  0101
501. Message_Length: 1059 Channel: 1 Time1: 530256321582 Time2: 530256321582
PACKET_DECODE: LOGICAL_CHANNEL_1 LOGICAL_ADDRESS: 3597 Destin: $89C1(Node 193).
Source: $4040(Node 64) PkType: 127(DATA_PACKET) Del_Class: 28($DC_NA_SEH_Large)
Total_Size: 1690 Packet_Size: 1059 Msg_ID: $062E Pkt_Seq_No: 1 Last_Pkt_Seq_No: 2
Version: 600
WM_DECODE:
Master_Node_Crb_Substate: 32(Cable_Master_Status: SLAVE, Cable_Primary_Selection: CABLE_A,
Cable_Mode: AUTO_SWITCHING, Cable_A_Status: GOOD, Cable_B_Status: SUSPECT, Cable_A_Marginal:
FALSE, Cable_B_Marginal: FALSE) Master_Node_Crb_State: 1 Work_Block_Id: 000000001FBF
Work_Block_Size: 1631 Personality_Load_Time: 1572864.272 Produce_Time: 1430406492.514
Receive_Time: 0.0 Consume_Time: 0.0 Return_Time: 0.0 Review Time: 0.0
Job_ID: 0.0.30.0.5(Local_CRB.NULL_FSQ.Node_Admin.NULL_DRQ.NA_STATUS_GRAM)
Local_Origin: 1(TRUE) Wait_On_IO_Completion: 0(FALSE) Transaction_Class: 0($One_Way)
Delivery_Class: 28($DC_NA_SEH_Large) Priority: 0 State: 2($$Produced_To_Local_Net)
Consumers_Address: 64 Senders_Address: 64 Return_Address: 64 Senders_CRB: 28
Return_Crb: 28 Save_Status: 1($Discard_After_Consumption)
Keep_Status: 0($$Release_Work_Block) Length: 1631 Acknowledgement: 0($ACK)
Request_Mode: 0($By_Value)
  89C1  4040  7F1C  069A  0423  062E  0102  0258  0220  0001  0000  0000  1FBF  0006  0001  0006
  0001  065F  000A  CDDC  0006  0001  0000  0018  0110  455C  5542  0202  0000  0000  0000  0000
  0000  0000  0000  0000  0000  0000  0000  0000  1E00  0501  0000  001C  0000  0200  0040
  0040  0040  001C  001C  0100  0006  0001  065F  0000  00D9  4B7C  001E  05AA  0040  013D  003A
  08AA  455C  448A  0F0A  0200  155C  0200  6000  0000  0009  DF2A  0009  E19A  2300  800F  0009
  DF2A  001E  7B60  0000  0000  0000  0001  0051  0000  0055  455C  448A  0F3E  0200  155D  0400
  0000  0000  0009  DF2A  0009  E19A  2300  800F  0009  DF2A  001E  7B60  0000  0000  0000  0001
  0051  0000  00AA  7478  BB9C  0001  02DB  155D  0462  4000  04C6  800F  BA5E  0019  2804  0005
  800F  BA54  000F  0000  0001  0000  0000  0000  0002  0000  0001  8055  7478  BB9C  0001  02DB
  155D  0462  6000  04C6  800F  BA5E  0019  2804  0005  800F  BA54  000F  0000  0001  0000  0000
  0000  0002  0000  0001  80AA  455C  448A  0F9A  0200  155D  0200  6000  0000  0009  DF2A  0009
  E19A  2300  800F  0009  DF2A  001E  7B60  0000  0000  0000  0001  0051  0000  0055  455C  448A
  0FEF  0200  1563  0400  0000  0000  0009  DF2A  0009  E19A  2300  800F  0009  DF2A  001E  7B60
  0000  0000  0000  0001  0051  0000  00AA  7478  BB9C  0001  02DB  1563  0462  4000  18F3  800F
  BA5E  0019  2804  0005  800F  BA54  000F  0000  0001  0000  0000  0000  0002  0000  0001  8055
  7478  BB9C  0001  02DB  1563  0462  6000  18F3  800F  BA5E  0019  2804  0005  800F  BA54  000F
  0000  0001  0000  0000  0000  0002  0000  0001  80AA  455C  448A  1049  0200  1563  0200  6000
  0000  0009  DF2A  0009  E19A  2300  800F  0009  DF2A  001E  7B60  0000  0000  0000  0001  0051
  0000  0055  455C  448A  107F  0200  1564  0400  0000  0000  0009  DF2A  0009  E19A  2300  800F
  0009  DF2A  001E  7B60  0000  0000  0000  0001  0051  0000  00AA  7478  BB9C  0001  02DB  1564
  0462  4000  FDD9  800F  BA5E  0019  2804  0005  800F  BA54  000F  0000  0001  0000  0000  0000
  0002  0000  0001  8055  7478  BB9C  0001  02DB  1564  0462  6000  FDD9  800F  BA5E  0019  2804
  0005  800F  BA54  000F  0000  0001  0000  0000  0000  0002  0000  0001  80AA  455C  448A  10D9
  0200  1564  0200  6000  0000  0009  DF2A  0009  E19A  2300  800F  0009  DF2A  001E  7B60  0000
  0000  0000  0001  0051  0000  0055  455C  448A  1109  0200  1504  0400  0000  0000  0009  DF2A
  0009  E19A  2300  800F  0009  DF2A  001E  7B60  0000  0000  0000  0001  0051  0000  00AA  7478
  BB9C  0001  02DB  1504  0462  4000  E2BF  800F  BA5E  0019  2804  0005  800F  BA54  000F  0000
  0001  0000  0000  0000  0002  0000  0001  8055  7478  BB9C  0001  02DB  1504  0462  6000  E2BF
  800F  BA5E  0019  2804  0005  800F  BA54  000F  0000  0001  0000  0000  0000  0002  0000  0001
  80AA  455C  448A  1164  0200  1504  0200  6000  0000  0009  DF2A  0009  E19A  2300  800F  0009
  DF2A  001E  7B60  0000  0000  0000  0001  0051  0000  0055  455C  448A  11B8  0200  1507  0400
  0000  0000  0009  DF2A  0009  E19A  2300  800F  0009  DF2A  001E  7B60  0000  0000  0000  0001
  0051  0000  00AA  7478  BB9C  0001  02DB  1507  0462  4000  F02A  800F  BA5E  0019  2804  0005
  800F  BA54  000F  0000  0001  0000  0000  0000  0002  0000  0001  8055  7478  BB9C  0001  02DB
  1507  0462  6000  F02A  800F  BA5E  0019  2804  0005  800F  BA54  000F  0000  0001  0000  0000
  0000  0002  0000  0001  80AA  455C  448A  120E  0200  1507  0200  6000  0001  0000  0040  0057
  0000  0118  0000  0009  DE2C  001E  7B60  0000  0000  0000  0001  0051  0000  0055  455C  448A
```

-continued

| | | | | | | | | | | | | | | | |
|---|---|---|---|---|---|---|---|---|---|---|---|---|---|---|---|
| 123B | 0200 | 1509 | 0400 | 0000 | 0001 | 0000 | 0040 | 0057 | 0000 | 0118 | 0000 | 0009 | DE2C | 001E | 7B60 |
| 0000 | 0000 | 0000 | 0001 | 0051 | 0000 | 00AA | 7478 | BB9C | 0001 | 02DB | 1509 | 0462 | 4000 | D510 | 800F |
| BA5E | 0019 | 2804 | 0005 | 800F | BA54 | 000F | 0000 | 0001 | 0000 | 0000 | 0000 | 0002 | 0000 | 0001 | 8055 |
| 7478 | BB9C | 0001 | 02DB | 1509 | 0462 | 6000 | D510 | 800F | BA5E | 0019 | 2804 | 0005 | 800F | BA54 | 000F |
| 0000 | 0001 | 0000 | 0000 | 0000 | 0002 | 0000 | 0001 | 80AA | 455C | 448A | 1295 | 0200 | 1509 | 0200 | 6000 |
| 0000 | 0009 | DF2A | 0009 | E19A | 2300 | 800F | 0009 | DF2A | 001E | 7B60 | 0000 | 0000 | 0000 | 0001 | 0051 |
| 0000 | 0055 | 455C | 448A | 12CC | 0200 | 1515 | 0400 | 0000 | 0000 | 0009 | DF2A | 0009 | E19A | 2300 | 800F |
| 0009 | DF2A | 001E | 7B60 | 0000 | 0000 | 0000 | 0001 | 0051 | 0000 | 00AA | 7478 | BB9C | 0001 | 02D5 | 1515 |
| 0462 | 4000 | D4F4 | 800F | BA5E | 0019 | 2804 | 0005 | 800F | BA54 | 000F | 0000 | 0001 | 0000 | 0000 | 0000 |
| 0002 | 0000 | 0001 | 8055 | 7478 | BB9C | 0001 | 02D5 | 1515 | 0462 | 6000 | D4F4 | 800F | BA5E | 0019 | 2804 |
| 0005 | 800F | BA54 | 000F | 0000 | 0001 | 0000 | 0000 | 0000 | 0002 | 0000 | 0001 | 80AA | 455C | 448A | 1334 |
| 0200 | 1515 | 0200 | 6000 | 0000 | 0009 | DF2A | 0009 | E19A | 2300 | 800F | 0009 | DF2A | 001E | 7B60 | 0000 |
| 0000 | 0000 | 0001 | 0051 | 0000 | 0055 | 455C | 448A | 1369 | 0200 | 155B | 0400 | 0000 | 0000 | 0009 | DF2A |
| 0009 | E19A | 2300 | 800F | 0009 | DF2A | 001E | 7B60 | 0000 | 0000 | 0000 | 0001 | 0051 | 0000 | 00AA | 7478 |
| BB9C | 0001 | 02DB | 155B | 0462 | 4000 | C762 | 800F | BA5E | 0019 | 2804 | 0005 | 800F | BA54 | 000F | 0000 |
| 0001 | 0000 | 0000 | 0000 | 0002 | 0000 | 0001 | 8055 | 7478 | BB9C | 0001 | 02DB | 155B | 0462 | 6000 | C762 |
| 800F | BA5E | 0019 | 2804 | 0005 | 800F | BA54 | 000F | 0000 | 0001 | 0000 | 0000 | 0000 | 0002 | 0000 | 0001 |
| 80AA | 455C | 448A | 13D5 | 0200 | 155B | 0200 | 6000 | 0000 | 0009 | DF2A | 0009 | E19A | 2300 | 800F | 0009 |
| DF2A | 001E | 7B60 | 0000 | 0000 | 0000 | 0001 | 0051 | 0000 | 0055 | 455C | 448A | 140A | 0200 | 1565 | 0400 |
| 0000 | 0000 | 0009 | DF2A | 0009 | E19A | 2300 | 800F | 0009 | DF2A | 001E | 7B60 | 0000 | 0000 | 0000 | 0001 |
| 0051 | 0000 | 00AA | 7478 | BB9C | 0001 | 02DB | 1565 | 0462 | 4000 | AC46 | 800F | BA5E | 0019 | 2804 | 0005 |
| 800F | BA54 | 000F | 0000 | 0001 | 0000 | 0000 | 0000 | 0002 | 0000 | 0001 | 8055 | 7478 | BB9C | 0001 | 02DB |
| 1565 | 0462 | 6000 | AC46 | 800F | BA5E | 0019 | 2804 | 0005 | 800F | BA54 | 000F | 0000 | 0001 | 0000 | 0000 |
| 0000 | 0002 | 0000 | 0001 | 80AA | 455C | 448A | 1466 | 0200 | 1565 | 0200 | 6000 | 0001 | 0000 | DF2A | 0057 |
| E19A | 2300 | 800F | 0009 | DF2A | 001E | 7B60 | 0000 | 0000 | 0000 | 0001 | 0051 | 0000 | 0055 | 455C | 448A |
| 149B | 0200 | 1566 | 0400 | 0000 | 0001 | 0000 | DF2A | 0009 | E19A | 2300 | 800F | 0009 | DF2A | 001E | 7B60 |
| 0000 | 0000 | 0000 | 0001 | 0051 | 0000 | 00AA | 7478 | BB9C | 0001 | 02DB | 1566 | 0462 | 4000 | 912C | 800F |
| BA5E | 0019 | 2804 | 0005 | 800F | BA54 | 000F | 0000 | 0001 | 0000 | 0000 | 0000 | 0002 | 0000 | 0001 | 8055 |
| 7478 | BB9C | 0001 | 02DB | 1566 | 0462 | 6000 | 912C | 800F | BA5E | 0019 | 2804 | 0005 | 800F | BA54 | 000F |
| 0000 | 0001 | 0000 | | | | | | | | | | | | | |

Of course, a wide variety of other formats could be used to display information.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    detecting, by a Local Control Network Monitor (LCN Monitor), a transmission of a data packet from a first device to at least one second device over a Local Control Network (LCN), the LCN Monitor not a source or destination of the data packet, wherein the first device and the at least one second device are directly connected through the LCN;

obtaining, by the LCN Monitor, a copy of the transmitted data packet;

decoding, by the LCN Monitor, the obtained data packet the step of decoding comprising:

classifying the obtained data packet as a single-packet message or as part of a multi-packet message, the obtained data packet is immediately decoded and recorded onto a mass storage device when classified as single packet, and the obtained data packet is saved and assembled into a full message prior to decoding and recording on the mass storage device when classified as multi-packet message;

storing, by the LCN Monitor, the decoded data packet in a storage device, and detecting by the LCN Monitor, one or more errors in or associated with the obtained data packet(s) including detecting any packet sequence number errors, orphan packets, or timed-out message reconstructions.

2. The method of claim 1, further comprising:
detecting, by the LCN Monitor, substantially all transmissions of data packets over the LCN.

3. The method of claim 2, wherein detecting substantially all transmissions of the data packets comprises detecting substantially all transmissions of the data packets over the LCN for a specified period of time.

4. The method of claim 1, further comprising:
determining whether the obtained data packet is a complete message or is a fragment of a multi-packet message.

5. The method of claim 4, further comprising, when the obtained data packet is the fragment of the multi-packet message:
obtaining one or more other data packets to complete the multi-packet message; and
decoding the completed multi-packet message.

6. The method of claim 1, wherein decoding the obtained data packet comprises decoding the obtained data packet into at least one of a human-readable form and a binary form.

7. The method of claim 1, further comprising:
receiving, by the LCN Monitor, a request to access the stored data packet; and
providing the stored data packet or information associated with the stored data packet for display.

8. An apparatus comprising:
at least one interface configured to communicate over a Local Control Network (LCN); and
at least one processing device configured to:
detect via the at least one interface a transmission of a data packet from a first device to at least one second device over the LCN, the apparatus not a source or destination of the data packet, wherein the first device and the at least one second device are directly connected through the LCN;
obtain a copy of the transmitted data packet;
decode the obtained data packet comprising:
classifying the obtained data packet as a single-packet message or as part of a multi-packet message, the obtained data packet is immediately decoded and recorded onto a mass storage device when classified as single packet, and the obtained data packet is saved and assembled into a full message prior to decoding and recording on the mass storage device when classified as multi-packet message;
store the decoded data packet in the mass storage device, and
detect by the LCN Monitor, one or more errors in or associated with the obtained data packet(s) including detecting any packet sequence number errors, orphan packets, or timed-out message reconstructions.

9. The apparatus of claim 8, wherein the at least one processing device is configured to detect substantially all transmissions of data packets over the LCN.

10. The apparatus of claim 9, wherein the at least one processing device is configured to detect substantially all transmissions of the data packets over the LCN for a specified period of time.

11. The apparatus of claim 8, wherein the at least one processing device is further configured to determine whether the obtained data packet is a complete message or is a fragment of a multi-packet message.

12. The apparatus of claim 11, wherein the at least one processing device is further configured, when the obtained data packet is the fragment of the multi-packet message, to:
obtain one or more other data packets to complete the multi-packet message; and
decode the completed multi-packet message.

13. The apparatus of claim 8, wherein the at least one processing device is configured to decode the obtained data packet into at least one of a human-readable form and a binary form.

14. The apparatus of claim 8, wherein the at least one processing device is further configured to:
receive a request to access the stored data packet; and
provide the stored data packet or information associated with the stored data packet for display.

15. A non-transitory computer-readable medium containing instructions that, when executed by at least one processing device of a Local Control Network monitor (LCN Monitor), cause the at least one processing device to:
detect a transmission of a data packet from a first device to at least one second device over a Local Control Network (LCN), the LCN Monitor not a source or destination of the data packet, wherein the first device and the at least one second device are directly connected through the LCN;
obtain a copy of the transmitted data packet;
decode the obtained data packet comprising:
classifying the obtained data packet as a single-packet message or as part of a multi-packet message, the obtained data packet is immediately decoded and recorded onto a mass storage device when classified as single packet, and the obtained data packet is saved and assembled into a full message prior to decoding and recording on the mass storage device when classified as multi-packet message;
store the decoded data packet in the mass storage device, and
detect one or more errors in or associated with the obtained data packet(s) including detecting any packet sequence number errors, orphan packets, or timed-out message reconstructions.

16. The non-transitory computer-readable medium of claim 15, further containing instructions that, when executed by the at least one processing device, cause the at least one processing device to detect substantially all transmissions of data packets over the LCN.

17. The non-transitory computer-readable medium of claim 15, further containing instructions that, when executed by the at least one processing device, cause the at least one processing device to:

determine whether the obtained data packet is a complete message or is a fragment of a multi-packet message; and when the obtained data packet is the fragment of the multi-packet message, obtain one or more other data packets to complete the multi-packet message and decode the completed multi-packet message.

18. The non-transitory computer-readable medium of claim 15, further containing instructions that, when executed by the at least one processing device, cause the at least one processing device to detect one or more errors associated with the data packet;

wherein the one or more errors comprise at least one of: a packet sequence number error, an orphan packet, and a timed-out message reconstruction.

* * * * *